United States Patent [19]

Müller et al.

[11] Patent Number: 4,542,779
[45] Date of Patent: Sep. 24, 1985

[54] TIRE CHAIN

[75] Inventors: Anton Müller, Aalen-Unterkochen; Hubert König, Aalen; Ludwig Wolfbeis, Aalen Hofherrnweiler, all of Fed. Rep. of Germany

[73] Assignee: Eisen- und Drahtwerk Erlau Aktiengesellschaft, Aalen, Fed. Rep. of Germany

[21] Appl. No.: 592,859

[22] Filed: Mar. 23, 1984

[30] Foreign Application Priority Data

Mar. 25, 1983 [DE] Fed. Rep. of Germany ....... 3310917

[51] Int. Cl.⁴ .............................................. B60C 27/06
[52] U.S. Cl. .......................... 152/213 A; 24/69 TT; 24/70 TT; 81/15.8; 152/217; 152/231; 152/239; 152/242
[58] Field of Search ............... 152/213 A, 213 R, 217, 152/219, 216, 214, 220, 231, 233–238, 239–242; 81/15.8; 24/69 T, 69 TT, 70 CT, 70 TT

[56] References Cited

U.S. PATENT DOCUMENTS 1,745,273  1/1930  Romain .......................... 152/213 A
2,363,998 11/1944  Royer ............................. 152/213 A
2,493,263  1/1950  Prehn ............................. 152/241 X Primary Examiner—Edward Kimlin
Assistant Examiner—Thomas Bokan
Attorney, Agent, or Firm—Becker & Becker, Inc.

[57] ABSTRACT

An antislip tire chain has provided therewith an inner part and an outer part joined together by a tread part. The inner part includes a fastener formed by a fastener member and a counter fastener member. An introduction opening of the fastener member is open in a direction towards the counter fastener member; via a guide portion extending transversely of the insertion direction of the counter fastener member, the fastener member is joined to an attachment or securing opening. In a region between the introduction opening and the attachment opening, which lies transversely of the guide portion, there is a securing element for the engaged counter fastener member. The fastener can be easily closed, the counter fastener member being reliably secured against unintentional release.

15 Claims, 23 Drawing Figures

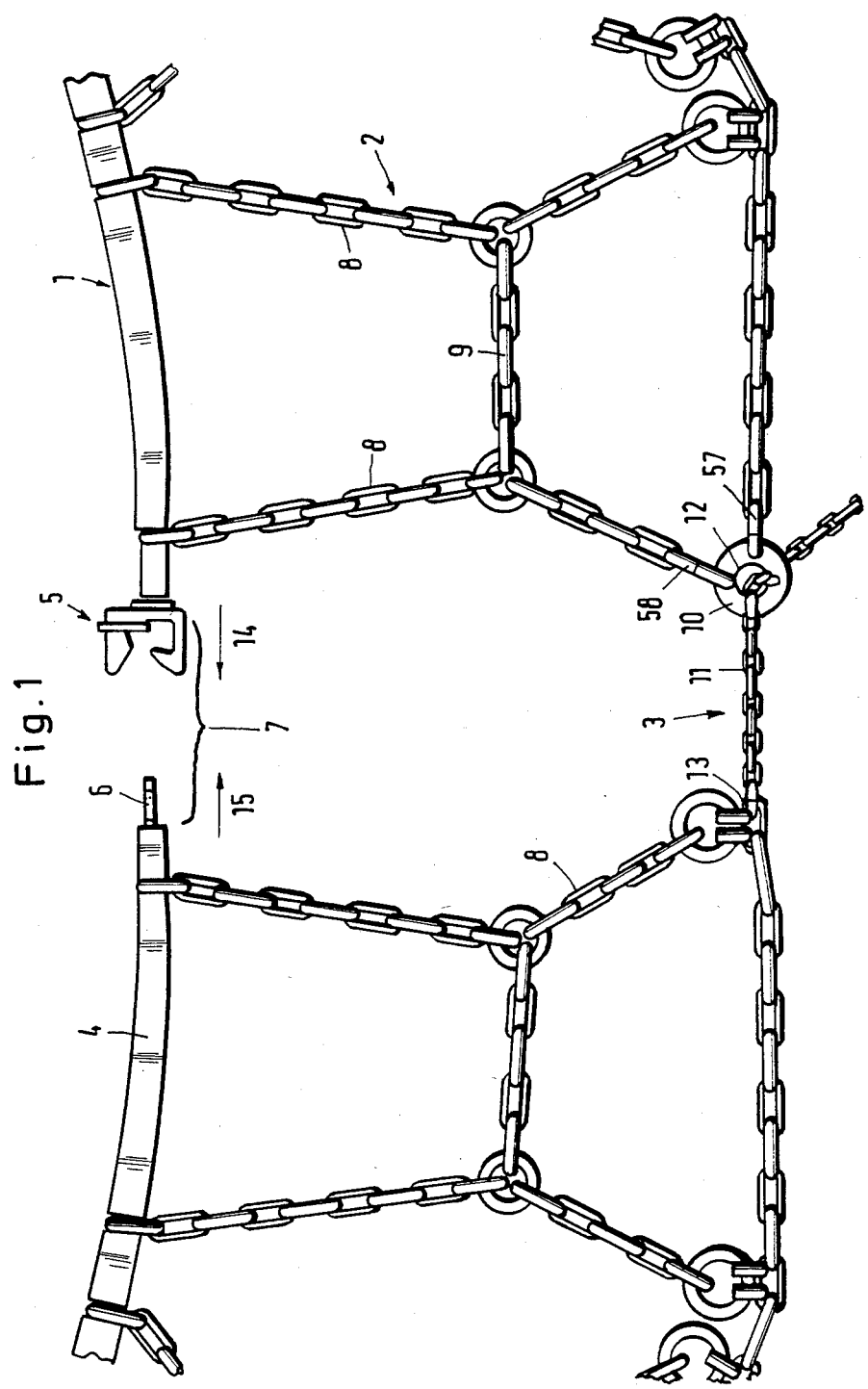

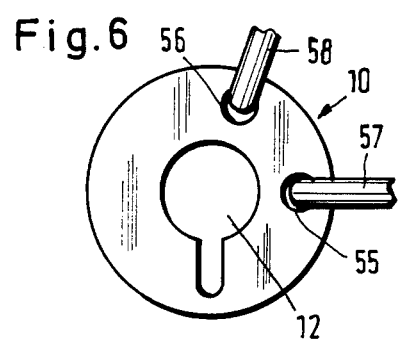
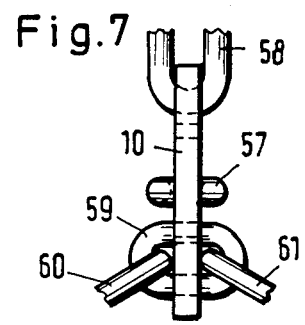
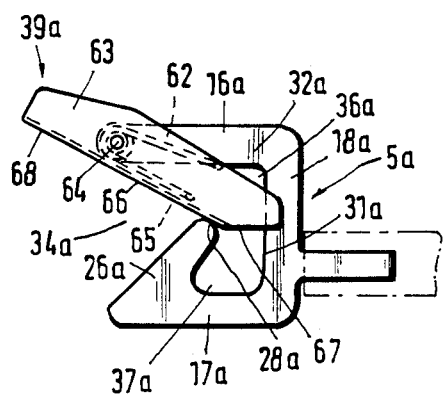
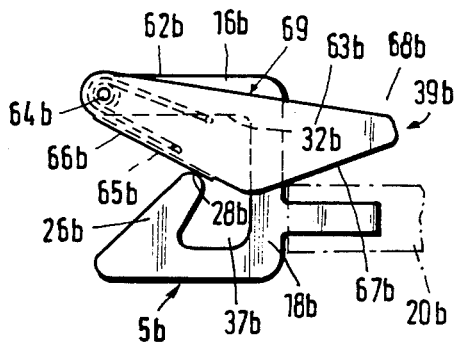

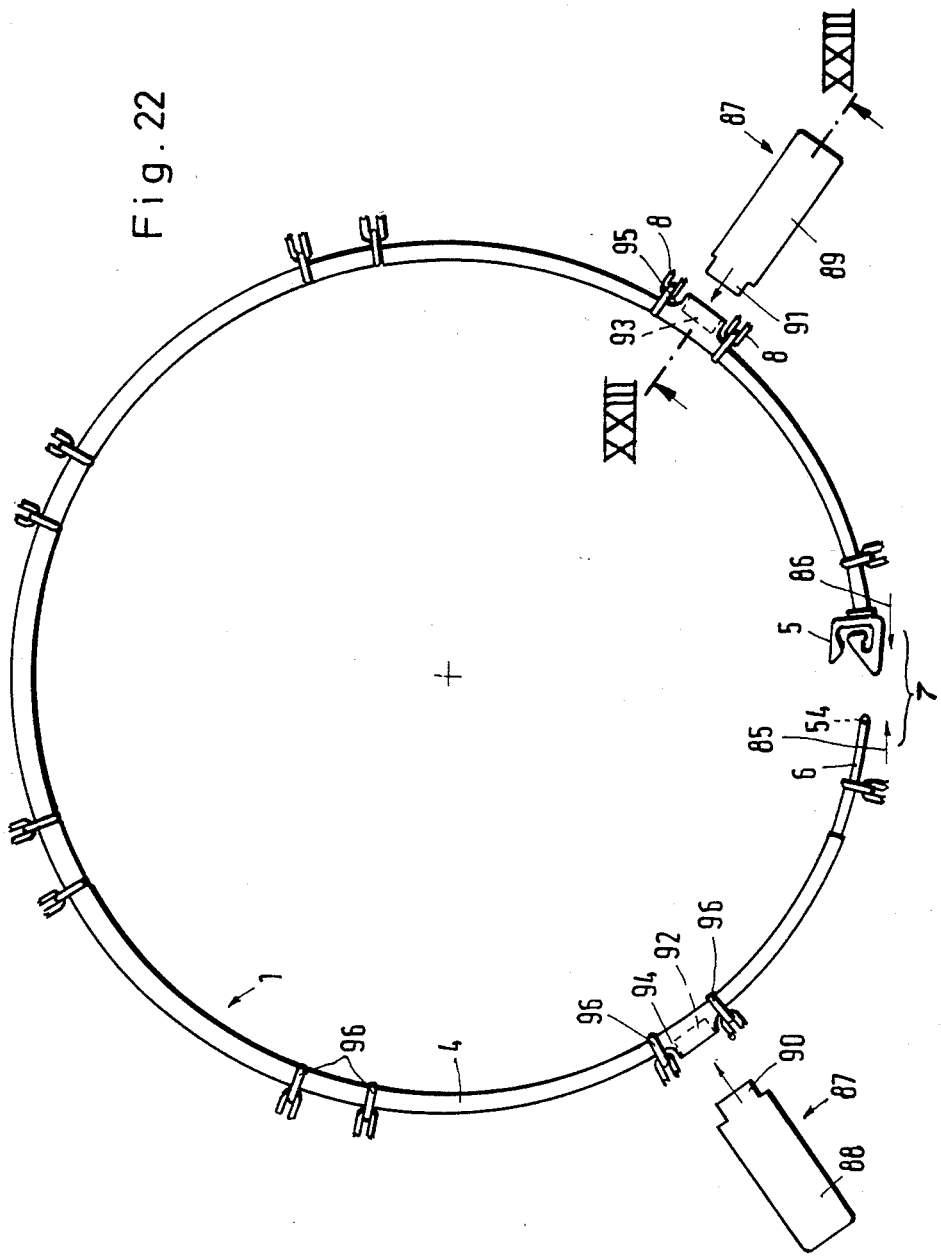

TIRE CHAIN

The present invention relates to a tire chain, particularly an anti-skid or antislip tire chain.

BACKGROUND OF THE INVENTION

1. Field of the Invention

The antislip tire chain includes an inner part and an outer part, as well as a tread part which joins the inner part and the outer part; the inner part includes at least one fastener having a fastener member and a counter fastener member, of which the fastener member provides an introduction opening and an attachment opening into which the counter fastener member can be engaged.

2. Description of the Prior Art

In such a known tire chain, the fastening member is formed by a hook into which the counter fastener member constructed as ring member is suspended for closing the fastener. When the chain is placed on the tire, the fastener is first open. The fastener is closed at the inner part only when the tire chain lies properly on the tire. Since the fastener is located behind the tire on closure, such fastener is not visible and this makes fitting of the tire chain more difficult.

The problem underlying the invention is to construct a tire chain of this type in such a manner that the fastener, disposed behind the tire and not visible during the closure or opening operation, can be closed and opened without difficulties, but unintentional self-opening of the fastener is impossible in spite of simple fitting facility.

SUMMARY OF THE INVENTION

An object of the present invention accordingly is to solve the foregoing problem by having the introduction opening arranged open in the direction towards the opposite counter fastener member; via at least one guide portion extending transversely of the insertion direction of the counter fastener member, the introduction opening is joined to the attachment opening which lies transversely of the guide portion; and in a region between the introduction opening and the attachment opening, at least one securing element is provided for the engaged counter fastener member.

With the tire chain according to the present invention, the fastener may be closed very simply because the introduction opening is open in the direction towards the opposite counter fastener member. On closure of the inner part, the counter fastener member thus necessarily moves into the introduction opening. It is therefore not necessary for the fastener to be visible during the closure operation. As soon as the counter fastener member has been led through the introduction opening, the counter fastener member reaches the guide portion which is disposed transversely to the insertion direction of the counter fastener member. At the guide portion, the counter fastener member is deflected and conducted to the attachment opening. The securing element at the transition from the guide portion to the attachment or introduction opening is so designed that, although the counter fastener member can simply be attached in the attachment opening, the counter fastener member cannot be unintentionally detached from the fastenar member. Since the guide portion lies transversely of the insertion direction of the counter fastener member, there is an additional guarantee that the fastener cannot be unintentionally opened. If, for example, the securing element is damaged, the guide portion prevents the attached counter fastener member from slipping out of the fastening member. During use of the tire chain, the fastener member cannot execute movements permitting movement thereof from the attachment opening to the introduction opening, especially since the tire chain is tensioned and thus the two fastener members are under a certain tension. In spite of the deflection of the counter fastener member on attachment or detachment, the fastener can be simply closed or opened because the counter fastener member is guided in a constrained manner on the guide portion such that the counter fastener member can be reliably pushed up to the introduction or attachment opening without the fastener being visible during the opening or closure operation.

BRIEF DESCRIPTION OF THE DRAWINGS

This object, and other objects and advantages of the present invention, will appear more clearly from the following specification in connection with the accompanying drawings, in which:

FIG. 1 shows a portion of a tire chain having an inner part and an outer part as well as a tread part therebetween with a fastener provided at the inner part thereof and including a fastener member as well as a counter fastener member having features according to the present invention;

FIG. 6 is an enlarged view of a deflection element in an outer part of the tire chain according to FIG. 1;

FIG. 7 is a side view of the deflection element according to FIG. 6;

FIG. 8 shows an example of another embodiment of a fastener member having features according to the present invention;

FIG. 9 shows a further embodiment of a fastener member having features according to the present invention;

FIG. 22 shows the inner part of the tire chain according to FIG. 1 with a fitting device.

DESCRIPTION OF PREFERRED EMBODIMENTS

Figure 2:
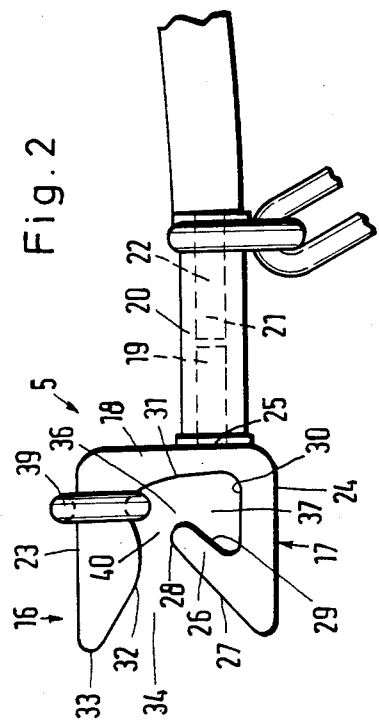
FIG. 2 is an enlarged view of the fastener member of the tire chain according to FIG. 1.

The tire chain is constructed as an anti-skid or antislip chain and has an inner part 1 which is connected via a tread part 2 to an outer part 3. The inner part 1 is preferably formed by a resilient fitting member 4 which extends almost through an angle of 360°; the inner part 1 at its ends comprises a fastener member 5 and a counter fastener member 6 that form a fastener 7 which, when the chain is fitted onto the tire, is open and after fitting thereon must be closed. The tread part 2 is formed by chain strands 8 running transversely to the direction of travel and connected together by track pieces 9 extending in the peripheral direction. The chain strands 8 and the track pieces 9 in the exemplified embodiment consist of identical annular chain links but may also comprise different chain links, in particular stud and ring links. The tread part 2 may also have a different tread configuration than that illustrated in FIG. 1.

The outer part 3, which is formed by a chain strand, at one end of the chain strand comprises a deflection element 10 through which a tensioning strand 11 is led. One end of the chain strands 8 is secured to the deflection element 10. The chain strand forming the outer part 3 and chain strands 8 as well as the track pieces 9 of the tread part 2 in the exemplified embodiment consist of identical chain links. The deflection element 10 is provided with a keyhole-shaped pull-through opening 12 through which the tensioning strand 11 is pulled. The tensioning strand 11 in the exemplified embodiment consists of a chain strand or length of which the chain links are preferably smaller than the links of the outer part 3. The tensioning strand 11 is secured to the end 13 of the outer part 3 opposite the deflection element 10. Also secured to this end 13, which is formed by an end-side link of the outer part 3, is the one end-side chain strand 8 of the tread part 2.

For fitting the tire chain to the tire, the fastener 7 is opened and the tensioning strand 11 is pulled back through the deflection element 10 to such an extent that the outer part 3 is expanded compared with its tensioned condition. Thereafter, the resiliently made fitting member 4 is resiliently drawn apart and fitted over the tire from the outside thereof. As soon as the fitting member 4 is disposed behind the tire, the fitting member 4 is released so that, due to its inherent elasticity, it springs back into its original position. The fitting member 4 is then resiliently pressed together from the outside of the tire, the fastener member 5 and the counter fastener member 6 thereby moving in the direction of the arrows 14 and 15, the counter fastener member 6 being automatically engaged into the fastener member 5 as will be described below. An advantageous effect in this closure operation is provided by the inner part 1 being formed by the resilient fitting member 4. Due to their inherent stiffness, the two members 5,6 of the fastener 7 can be plugged together easily from the outside of the tire because the two fastener members are constrained to run along the tire flank. Due to the annular form by pressing together of the fitting member 4 in assembled or joined relationship, the fastener 7 is automatically closed so that the user of the tire chain need not see the fastener 7 itself.

After the closure of the fastener 7 at the inside, the tensioning strand 11 is tightened, sliding through the deflection element 10 until the outer part 3 has the necessary tension. Thereafter the tensioning strand 11 is moved away from the tire outer side and one of the links of the tensioning strand 11 engages into the narrow portion of the pull-through opening 12. The tensioning strand 11 is thereby secured against displacement relative to the deflection element 10 and can be easily threaded into the outer part 3. Since the tensioning strand 11 is secured at the deflection element 10 when it is threaded into the outer part, the tensioning strand 11 cannot slip back so that the tension of the outer part during the threading in is not reduced. In particular, the user need not hold the tensioning strand 11 constantly under tension during the threading in, and this considerably facilitates the fitting of the tire chain.

Figure 3:
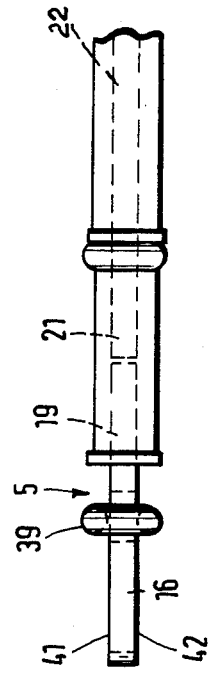
FIG. 3 is a plan view of the fastener member according to FIG. 2.

As shown by FIGS. 2 and 3, the fastener member 5 is made flat and has a substantially U-shape with parallel legs 16 and 17 which are connected together by a cross web 18 lying perpendicular thereto. At the cross web 18 at the back, there is provided a securing pin 19 on which a clamping bush 20 is secured that is also clamped onto the free end 21 of a spring steel part 22 of the fitting member 4. The outer side 23 of leg 16 and the outer side 24 of leg 17, remote from each other, and the outside 25 of the cross web 18 are made planar and merge arcuately into each other. The free end 26 of the leg 17 extends inclined inwardly in the direction towards the opposite leg 16. The outer side 24 of the leg 17 merges arcuately into the one outer side 27 of the free end 26. The outer side 27 is at an acute angle to the outer side 24, preferably at an angle of about 45°, and is made straight. The end side 28 of the free end 26, in the side view according to FIG. 2, is curved substantially semi-circularly and joins the outer side 27 to the opposite inner side 29 of the free end 26 which extends substantially parallel to the outer side 27. The inner side 29 is only about half as long as the outer side 27 and merges arcuately into an inner side 30 of the leg 17 extending parallel to the outer side 24. The inner side 30 is at an acute angle to the inner side 29 and merges arcuately into an inner side 31 of the cross web 18. The inner side 31 is at an acute angle to the outer side 25 of the cros web such that the latter widens from the leg 17 in the direction towards the leg 16. The inner side 31 is gradually curved over its length and merges in the region above the end side 28 of the free leg end 26 arcuately into an inner side 32 of the leg 16. The inner side 32 is outwardly curved in the direction towards the opposite leg 17 so that the leg 16 has its greatest width substantially at half its length and decreases in width in the direction towards its end side 33 and in the direction towards the cross web 18. The inner side 32 extends in the direction towards the end side 33 at an acute angle with respect to the outer side 23 and merges via the rounded end side 33 into the outer side 23.

The free end 26 of the leg 17 and the opposite portion of the leg 16 define an introduction opening 34 for the counter fastener member 6 which narrows in the direction towards the cross web 18. The introduction opening 34 is defined by the outer side 27 of the leg end 26 and by the inner side 32 of the leg 16. Since the introduction opening 34 narrows in the insertion direction 15 (FIG. 1) of the counter fastener member 6, the latter can be easily introduced into the fastener member 5. The straight faces of the outer side 27 and of the inner side 32 can serve as guide faces if the counter fastener member 6 meets them on insertion. The end side 28 of the leg end 26 lies substantially at the level of the greatest width of the leg 16 so that the introduction opening 34 has a restriction at this point to provide its smallest width which is only slightly greater than the thickness 35 of the counter fastener member 6. The introduction opening 34 merges into a guide portion 36 which is defined by the inner side 31 of the cross web 18 and extends approximately perpendicularly to the insertion direction 15. The guide portion 36 connects the introduction opening 34 to a securing or attachment opening 37 which is defined by the leg 17 and the free end 26. In the closure position the counter fastener member 6 is in the attachment opening 37. The free end 26 serves as an attachment hook for the counter fastener member 6 which is made annular; and the free end 26 projects through the ring opening 38 of the fastener member 6. Since the free end 26 is inclined, an additional guarantee against unintentional uncoupling of the counter fastener member 6 is provided.

Upon closure of the fastener 7, the counter fastener member 6 first moves into the introduction opening 34. Since the inner side 32 and the outer side 27 serve as guide faces, the counter fastener member 6 is conducted in the direction towards the guide portion 36 even when the counter fastener member 6 is inserted not exactly centrally into the introduction opening 34. On further insertion, the counter fastener member 6 comes into the guide portion 36 and is deflected along the inner side 31 in the direction towards the attachment or securing opening 37. Since the transition from the inner side 31 to the inner side 30 is curved, the counter fastener member 6 can be moved easily into the attachment opening 37. For closing the fastener 7, the direction of movement of the counter fastener member 6 is changed twice before it reaches the attachment opening 37. When the counter fastener member 6 is to be uncoupled from the fastener member 5, these movements of the counter fastener member 6 must be carried out in the reverse direction. During the use of the tire chain, these movements cannot however be carried out by the counter fastener member 6 because the inner part 1 of the tire chain is under tension so that the counter fastener member 6 under tension engages the hook-shaped end 26 of the leg 17 of the fastener member 5. This with great certainty prevents unintentional opening of the fastener 7. This certainty is further increased by providing a securing element 39 which prevents easy uncoupling of the counter fastener member 6. The securing element 39 is constructed as a ring which engages around the leg 16 at the transition thereof to the cross web 18. The securing element 39 is disposed at the transition from the guide portion 36 to the introduction opening 34. Between the end side 28 of the leg end 26 and the securing element 39, a passage 40 is thus formed having a width that is only slightly greater than the thickness 35 of the counter fastener member 6. As a result, the counter fastener member 6 can only be pushed through the passage 40 when it is exactly aligned with respect to the fastener member 5. As soon as the counter fastener member 6 is inclined to the fastener member 5 it cannot be pushed through the passage defined on on side by the securing element 39. Thus, in combination with the various movement directions of the counter fastener member 6, the securing element 39 ensures that the fastener 7 can only be opened when this is desired by the user.

The fastener member 5 is made flat and has planar outer sides 41 and 42 parallel to each other (FIG. 3). The fastener member 5 can be made in simple manner as a stamping. The introduction opening 34, the guide portion 36 and the attachment opening 37 pass through the fastener member 5 so that it is impossible for dirt, ice and the like to become lodged in these portions when the tire chain is in use. This ensures that the fastener 7 can be closed and opened at any time even when the tire chain is fitted in snow or has been used in snow.

Figure 4:
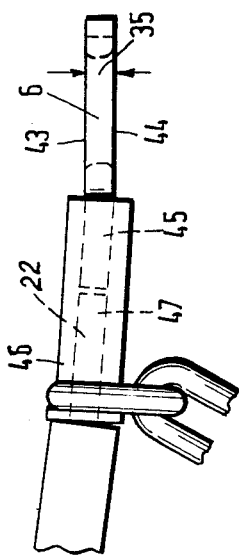
FIG. 4 is an enlarged view of the counter fastener member of the tire chain according to FIG. 1.

The counter fastener member 6 is also made flat and has two planar outer sides 43 and 44 parallel to each other (FIG. 4). The counter fastener member 6 is made frame-shaped and, at its one narrow side, is provided with an extension 45 which is inserted into a clamping sleeve 46 into which the other free end 47 of the spring steel member 22 is inserted. The counter fastener member 6 may also be made as a stamping. At the side facing the fastener member 5, the counter fastener member 6 is provided with two preferably cam-shaped guide portions 48 and 49 which are formed by extensions of the parallel legs 50, 51 of the counter fastener member. The facing sides 52 and 53 of the guide portions 48 and 49 converge in the direction towards the ring opening 38 and are joined together by a flat side 54 which extends perpendicular to the legs 50, 51. The guide portions 48 and 49 serve as lateral guides when the counter fastener member 6 is engaged into the fastener member 5. The inclined sides 52, 53 ensure that the counter fastener member 6 can be engaged reliably in the fastener member 5 even if it does not meet the fastener member 6 exactly in the center.

The deflection element 10 is made as circular plate (FIG. 6) and in the edge region thereof comprises two openings 55 and 56 for connection of an end-side link 57 of the outer part 3 and an end-side link 58 of the tread chain strand 8 (FIGS. 1 and 6). The deflection element 10 thus serves not only to deflect the tensioning strand 11 but also for the articulate connection of the one end-side chain strand 8 of the tread part 2 and of the one outer part end. As a result, no additional connection members are necessary. The keyhole-shaped pull-through opening 12 is so formed that the tensioning strand 11 can be easily pulled through the larger opening portion thereof and can be arrested in the narrower opening portion thereof. As FIG. 7 shows, in the locking position, one of the links 59 lies in the narrower opening portion and is secured in said opening portion by the adjacent links 60 and 61.

In the embodiments according to FIGS. 8 to 12, the fastener members are made similar to those in the previously described embodiment according to FIGS. 1 to 3. However, in each case differently formed securing elements are provided in these fastener members.

In the fastener member 5*a* according to FIG. 8, the inner side 32*a* of the leg 16*a* is flat. Otherwise, the fastener member 5*a* is made identically when compared to that in the embodiment according to FIGS. 1 to 3. At the free end 62 of the leg 16*a*, the securing element 39*a* is pivotally mounted. The securing element 39*a* is made U-shaped and two legs 63 thereof, of which in FIG. 8 only one is visible, engage around the leg 16a on both sides thereof. The securing element 39a is mounted on a transverse pin 64 which is secured at the free end 62 of the leg 16a. Also mounted on the transverse pin 64 there is a leg spring 65 which engages a cross web 66 of the securing element 39a and which biases the latter in the direction towards its closure position illustrated in FIG. 8. The cross web 66 lies in the closure position on the end side 28a of the free end 26a of the leg 17a. The leg spring 65 lies protected between the two legs 63 of the securing element 39a. The legs 63 extend up to the cross web 18 of the closure member 5a so that the leg ends lie on both sides of the cross web 18a. The cross web 66 of the securing element 39a extends only slightly beyond the end side 28a of the leg end 26a so that the leg ends projecting in the direction towards the cross web 18a are not connected to each other. As a result, the securing element 39a can pivot about the transverse pin 64 against the force of the leg spring 65 upwardly until the cross web 66 strikes the inner side 32a of the fastener member leg 16a. To ensure an adequate passage cross-section for the counter fastener member 6 in the open position of the securing element 39a, the legs 63 following the cross web 66 are provided with a bevelled lower edge portion 67, which is so disposed that in the open position of the securing element 39a such bevelled lower edge portion 67 lies in the region adjacent to the leg 16a.

The legs 63 of the securing element 39a project beyond the side of the transverse pin 64 remote from the cross web 18a and form a grip portion 68 with which the securing element 39a can be pivoted by hand into its open position. The cross web 66 is directed inclined upwardly from the free end 26a and thereby forms a guide face for the counter fastener member 6. The cross web 66 guides the counter fastener member in the direction towards the introduction opening 34a so that a reliable closing of the fastener is ensured. The introduction opening 34a is joined via the guide portion 36a extending perpendicular thereto to the attachment or securing opening 37a which is made similar to the attachment opening according to FIGS. 1-3. The inner side 31a of the cross web 18a extends rectilinearly and perpendicularly to the legs 16a, 17a of the fastener member 5a and defines the guide portion 36a. In the closure position according to FIG. 8, the attachment opening 37a is completely closed by the securing element 39a so that certain retention of the engaged counter fastener member is achieved.

In the embodiment according to FIG. 9, the fastener member 5b is made similar to that in the embodiment according to FIG. 8. The securing element 39b is also made U-shaped and has two legs 63b which are connected together by the cross web 66b. The securing element 39b is pivotally mounted on the transverse pin 64b at the free end 62b of the leg 16b. The legs 63b engage around the leg spring 65b which bears on the cross web 66b and on the inner side 32b of the leg 16b and biases the securing element 39b in the direction towards its closure position illustrated in FIG. 9. In contrast to the previous embodiment, the securing element 39b is articulately connected at one end to the fastener member 5b. It thereby projects beyond the cross web 18b of the closure fastener and forms a grip portion 68b for the securing element 39b. The length of the cross web 66b is only such that it can bear on the end side 28b of the leg end 26b in the closure position.

The portions of the two legs 63b of the securing element 39b projecting beyond the cross web 66b are therefore not connected to each other. To ensure that the legs 63b in the closure position do not come in contact with the clamping sleeve 20b, the lower edge 67b of the portions of the legs projecting beyond the cross web 66b are bevelled. The upper edge 69 of the legs 63b extends in contrast rectilinearly over the entire length of the legs. As a result, the legs 63b in side view (FIG. 9) have substantially the form of an isosceles triangle whose cathetus sides merge curved into each other. The tip of the legs 63b in the region above the clamping sleeve 20b is bevelled so that there is no danger of injury on actuation of the securing element 39b. Due to the bevelled edge 67b, between the grip portion 68b and the clamping sleeve 20b there is enough space to enable the user to engage the grip portion 68b from below and pivot the securing element 39b upwardly. In the closure position, the attachment opening 37b is completely closed by the securing element 39b so that unintentional uncoupling of the counter fastener member 6 is impossible. However, as in the embodiment according to FIG. 8, the counter fastener member 6 can easily be disengaged because the securing element 39b can be pivoted upwardly against the force of the leg spring 65b so that the counter fastener member 6 can be pushed out along the cross web 66b.

Figure 10:
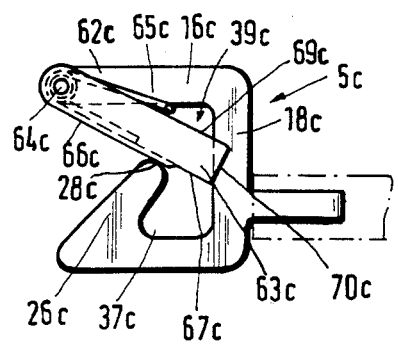
FIG. 10 shows another embodiment of a fastener member having features according to the present invention.

In the embodiment according to FIG. 10 the securing element 39c is also U-shaped and articulately connected with one end at the transverse pin 64c which is disposed at the free end 62c of the leg 16c of the fastener member 5c. The length of the cross web 66c is such that, in the closure position of the securing element 39c, the cross web 66c bears on the end side 28c of the leg end 26c. The two legs 63c of the securing element 39c project beyond the cross web 66c up to the level of the cross web 18c of the fastener element 5c. The upper edge 69c and the lower edge 67c of the legs 63c extend parallel to each other and are connected together by an end side 70c extending perpendicular to them. The securing element 39c is subjected to the force of a leg spring 65c which bears on the upper leg 16c and on the cross web 66c and is mounted on the transverse pin 64c. The securing element 39c, in the closure and open position, does not project beyond the fastener element 5c so that only a small installation space is necessary for the fastener element. In the closure position (FIG. 10), the securing element 39c completely closes the attachment opening 37c.

Figure 11:
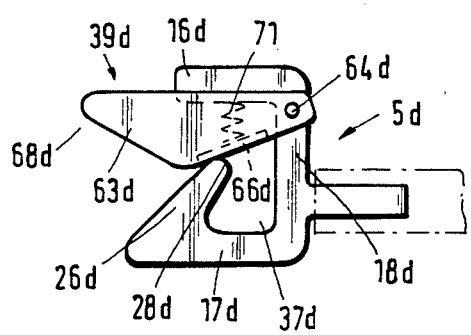
FIG. 11 shows still another embodiment of a fastener member having features according to the present invention.

In the embodiment according to FIG. 11 the securing element 39d is mounted at one end on the transverse pin 64d pivotally against the force of a pressure spring 71 which bears on the leg 16d of the fastener element 5d and on the cross web 66d of the securing element 39d. The transverse in 64d passes through the cross web 18d of the fastener member 5d near the transition to the leg 16d. The cross web 66d bears on the end side 28d of the leg end 26d. It extends in the closure position of the securing element 39d into the vicinity of the cross web 18d of the fastener member 5d. The legs 63d of the securing element 39d are made similar to those in the embodiment according to FIG. 9. Since, however, the transverse pin 64d is provided at the cross web 18d of the fastener member, the transverse pin 64d passes through the legs 63d near the bevelled tip. The legs 63d project beyond the legs 16d, 17d of the fastener member 5d. The projecting portions of the legs 63d form the grip portion 68d with which the securing element 39d can be pivoted into the open position against the force of the pressure spring 71. The securing element 39d completely closes the attachment opening 37d.

Figure 12:
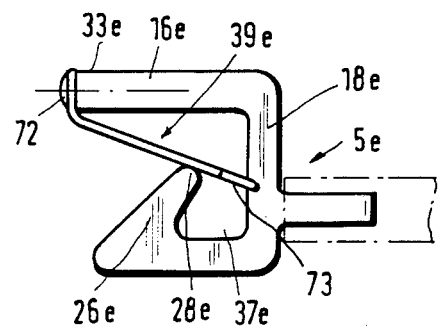
FIG. 12 shows still a further embodiment of a fastener member having features according to the present invention.

The securing element 39e according to FIG. 12 is constructed as a spring element which is secured to the end side 33e of the leg 16e of the fastener member 5e with a screw 72 or the like. The spring or securing element 39e bears preferably under biasing on the end side 28e of the leg end 26e and extends up to the cross web 18e of the fastener member 5e. The free end 73 of the securing element 39e is made U-shaped so that the resulting legs lie on either side of the cross web 18e. The securing element 39e completely closes the attachment opening 37e of the fastener member 5e. Since the securing element 39e extends inclined from the leg 16e of the fastener member 5e, upon insertion of the counter fastener member, the securing element 29e is necessarily pushed upwardly so that the counter fastener member can be engaged. Upon this engagement of the counter fastener member, the securing element 39e is also pivoted upwardly so that it releases the counter fastener member. Thereafter, due to securing element biasing, the securing element 39e springs back into the closure position illustrated in FIG. 12. The securing element 39e is detachably secured by means of the screw 72 on the fastener member 5e so that it can easily be replaced. In the embodiments described previously, the securing elements are also preferably mounted replaceably on the fastener member. In this case, the transverse pin is mounted detachably on the fastener member.

Figure 13:
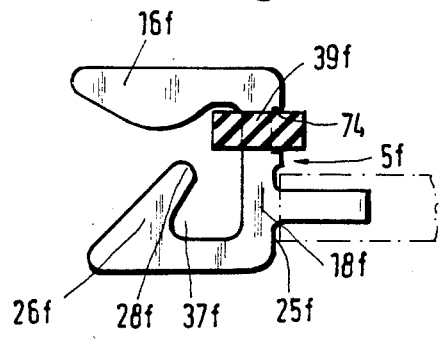
FIG. 13 shows yet another embodiment of a fastener member having features according to the present invention.
Figure 14:
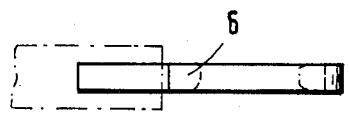
FIG. 14 is a further embodiment of a counter fastener member having features according to the present invention.
Figure 15:
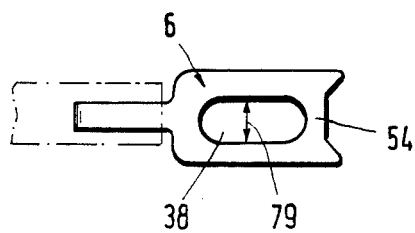
FIG. 15 is a plan view of the counter fastener member according to FIG. 14.

In the embodiment according to FIG. 13, the securing element 39f is a resilient rubber ring which is mounted on the cross web 18f at the transition to the leg 16f of the fastener member 5f. The distance between the securing element 39f and the opposite end side 28f of the leg end 26f is smaller than the thickness 35 (FIG. 4) of the counter fastener member 6 so that the latter can be engaged in the attachment opening 37f only by resiliently deforming the securing element 39f. Correspondingly, the securing element 39f must be elastically deformed when the counter fastener member is to be disengaged from the fastener member 5f. To prevent the securing element 39f from moving out of its proper position on the cross web 18f, the securing element 39f is preferably held in a positive manner on said web 18f. For this purpose, the latter is provided at its outer side 25f with a recess 74 into which the resilient rubber ring or annular securing element 39f engages and is thus secured in position.

Figure 5:
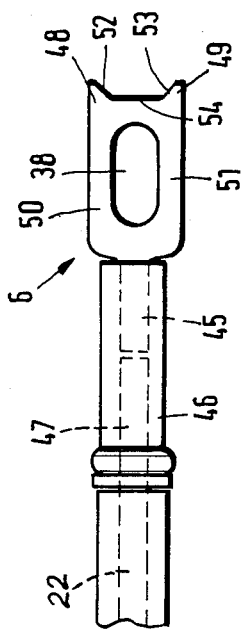
FIG. 5 is a plan view of the counter fastener member according to FIG. 4.
Figure 16:
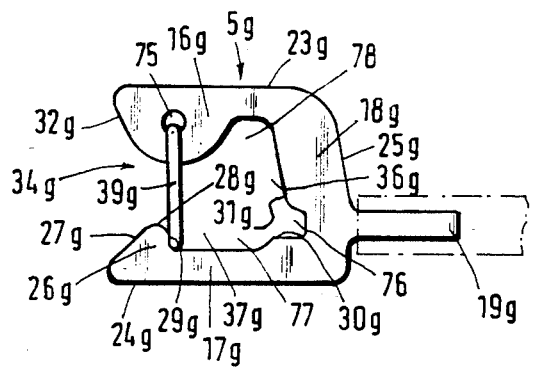
FIG. 16 is a further embodiment of a fastener member.

FIGS. 14–17 show a counter fastener member and the associated fastener member. The counter fastener member 6 (FIGS. 14 and 15) is made similar to that in the embodiment of FIGS. 4 and 5. The fastener member 5g of FIG. 16 is made U-shaped and has two legs 16g and 17g which are connected together by a cross web 18g. The flat parallel outer sides 23g and 24g of the two legs 16g and 17g merge arcuately into the outer side 25g of the cross web 18g. The outer side 25g extends at an obtuse angle to the outer side 23g up to the securing pin 19g which as in all the embodiments previously described is closer to the leg 17g than to the leg 16g. The outer side 25g extends from the securing pin 19g perpendicular to the outer side 24g of the leg 17g.

At the free end, the leg 16g is made thicker and provided with an attachment opening 75 for the securing element 39g made as ring. The thickened leg end in side view according to FIG. 16 has a substantially semicircular shape and extends substantially over half the length of the leg 16g. The inner side 32g of the leg 16g therefore extends substantially semicircularly in the region of the thickened end. It then merges concavely with respect to the leg 17g into the inner side 31g of the cross web 18g. The inner side 31g extends parallel to the outer side 25g. At the level of the securing pin 19g in the inner side 31g, there is provided a depression 76 which is of substantially rectangular cross-section and into which, in the disengagement operation, the counter fastener member 6 engages with its side 54 as will be described below. The depression 76 is defined at one side by the inner side 30g of the leg 17g which comprises an elongated recess 77 which extends up to the free end 26g of the leg 17g. The free end 26g is made hook-shaped as in the previous examples of embodiment and has an outer side 27g which forms an acute angle, preferably about 45°, relative to the outer side 24g and which merges via the arcuate end side 28g into the inner side 29g of the free end 26g. The outer side 27g and the inner side 29g diverge in the direction towards the outer side 24g. The inner side 29g is at an obtuse angle to the inner side 20g of the leg 17g and defines the recess 77 at one end.

Figure 19:
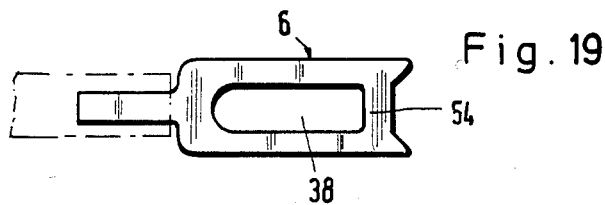
FIG. 19 is a plan view of the counter fastener member according to FIG. 18.

The outer side 27g and the arcuately extending inner side 32g define the introduction opening 34g and again form guide faces for the counter fastener member 6. The securing element 39g is pivotally disposed in the attachment opening 75 and in the closure position bears on the inner side 29g of the leg end 26g. To ensure that this is the case, the inner side 29g is offset with respect to the attachment opening 75 so that the securing element 39g, in the horizontal position of the fastener member 5g illustrated in FIG. 16, due to gravity bears on the inner side. Upon insertion of the counter fastener member 6, the securing element 39g is pivoted into its release position. The recess 77 is so long that the securing element can pivot unrestrictedly in the direction towards the leg 16g. Due to the concave path of the inner side 32g at the leg 16g, an inner depression 78 is formed into which the securing element 39g can be pivoted so that the counter fastener member 6 can be pushed through the introduction opening 34g into the guide portion 36g. The latter is defined by the inner side 28g of the cross web 18g along which the counter fastener member 6 can be displaced downwardly in the direction towards the attachment opening 37g. As soon as the counter fastener member 6 has been pushed into the guide portion 36g, the securing element 39g drops back into its closure position. The internal clear width 79 of the counter fastener member 6 is greater than the external width 80 (FIG. 17) of the securing element 39g so that the latter in the closure position engages into the oblong loop or ring opening 38 (FIGS. 15 and 19) of the counter fastener member 6. Since the securing element in the disengagement direction of the counter fastener member 6 bears on the inner side 29g of the leg end 26g, the securing element 39g cannot be unintentionally pivoted into its closure position. The depression 76 in the cross web 18g serves as an additional guarantee against unintentional disengagement of the counter fastener member 6. If the latter is displaced in the fastener member 5g up to the cross web 18g, the side 54 of the counter fastener member 6 enters the depression 76 and the counter fastener member 6 is thus secured against transverse movements. The counter fastener member 6 thus cannot, of its own accord, move into the guide portion 36g. For this purpose, the counter fastener member 6 would have to be pushed out of the depression 76 again and then moved transversely thereof into the guide portion 36g. The embodiment of the fastener member 5g is distinct and characterized by having a simple construction, shape or form. The fastener member 5g and the counter fastener member 6 are simple stampings which can be made at low cost. The securing element 39g, formed by a metal ring, is resistant to wear. Preferably, the diameter of the attachment opening 75 is greater than the wire diameter of the securing element 39g. This prevents dirt or the like from clogging the attachment opening 75 and impairing the pivotability of the securing element 39g. When the tire chain is fitted onto a vehicle tire, for example, the securing element 39g is firmly pressed against the free end 26g and against the tire so that a reliable securing of the engaged counter fastener member 6 is guaranteed. For intentional opening of the fastener, the tensioning strand 11 is loosened. The leg 16g, upon opening of the fastener, lies at the lower side. Due to gravity, the securing element 39g drops into the inner depression 78 so that the counter fastener member 6 can be easily disengaged.

Figure 20:
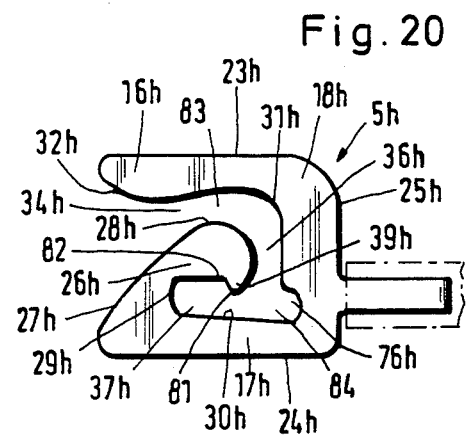
FIG. 20 is a further embodiment of a fastener member having features according to the present invention.
Figure 21:
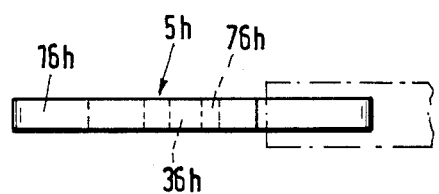
FIG. 21 is a plan view of the fastener member according to FIG. 20.

In the embodiment according to FIGS. 20 and 21, the securing element 39h is formed by a portion of the free end 26h of the fastener member leg 17h. The securing element 39h is formed as a nose which partially defines the attachment opening 37h. The free end 26h projects somewhat beyond half the height of the fastener member 5h of FIG. 21 as is also the case in the embodiments according to FIGS. 2, 3 and 8-13. The outer side 27h of the free end 26h is gradually curved over the entire length and is at an acute angle to the flat outer side 24h of the leg 17h which extends parallel to the outer side 23h of the other leg 16h of the fastener member 5h. The two outer sides 23h and 24h each merge arcuately into the outer side 25h of the cross web 18h of the fastener member 5h. The outer side 27h of the leg end 26h merges in a continuous curve into the substantially semicircularly curved end side 28h which continues into an end side 81 of the securing element 39h extending substantially semicircularly in the side view according to FIG. 20. The attachment opening 37h is defined by the inner side 30h of the leg 17h, the inner side 29h of the leg end 26h and a further inner side 82 of the leg end. The inner side 30h of the leg 17h is flat and extends in the direction towards the cross web 18h of the fastener member 5h converging with respect to the outer side 24h. The inner side 30h merges in a continuous curve to the inner side 29h which extends substantially parallel to the outer side 25h of the cross web 18h and at an obtuse angle to the inner side 30h. The further inner side 82 is at right angles to the inner side 29h into which it merges arcuately. The attachment opening 37h narrows due to the form described in the direction towards the free end 26h. The inner side 82 adjoins the curved end side 81 of the securing element 39h.

Figure 17:
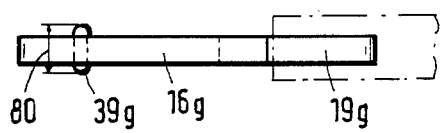
FIG. 17 is a plan view of the fastener member according to FIG. 16.
Figure 18:
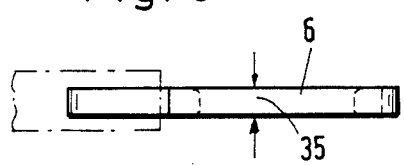
FIG. 18 is a further embodiment of a counter fastener member having features according to the present invention.

As in the embodiment according to FIGS. 16 and 17, the inner side 30h of the leg 17h in the region of cross web 18h forms the one side wall of a depression 76h provided in the inner side 31h of the cross web 18h. The inner side 31h extends substantially parallel to the outer side 25h and merges arcuately into the inner side 32h of the leg 16h which, in a side view thereof, is curved in an S-shaped manner in accordance with FIG. 20.

The outer side 27h and the inner side 32h at the free end of the leg 16h form converging side walls of the introduction opening 34h which is defined by these two leg ends. At these converging faces, the counter fastener member 6 is reliably guided into the fastener member 5h. The end side 28h of the leg end 26h over a major portion thereof extends parallel to the inner side 32h which, in this region, is made concave with respect to the leg 17h. As a result, a narrow guide passage 83 is formed in which the side 54 of the counter fastener member is guided. The guide passage 83 merges in a continuous curve into the guide portion 36h which is defined laterally by the cross web 18h and the hook-shaped free end 26h. The guide portion 36h lies substantially perpendicular to the guide passage 83 and merges into an intermediate guide portion 84 which is at right angles thereto and which opens into the attachment opening 37h and is defined by the securing element 39h and the leg 17h.

The counter fastener member 6 associated with the fastener member 5h is made substantially the same as in the previously described examples of embodiments thereof. Only the ring opening 38 is longer because the free end 26h of the fastener member 5h, as seen in the direction of the legs 16h and 17h, is longer than the free ends of the previously described examples of other embodiments of fastener members.

Upon insertion of the counter fastener member 6, the front side portion 54 passes from the introduction opening into the guide passage 83. Due to the form described, the counter fastener member 6 is guided at the inclined guide faces 27h, 32h reliably into the guide passage irrespective of where the counter fastener member 6 meets said guide faces 27h, 32h. Upon further displacement, the counter fastener member 6 is guided by the guide passage 83 reliably into the guide portion 36h perpendicular thereto and, from this guide portion 36h, the counter fastener member 6 moves over the intermediate guide portion 84 into the attachment opening 37h. Although the distance between the securing element 39h and the opposite leg 17h is slightly greater than the thickness 35 of the counter fastener member 6, the securing element 39h nevertheless to a high degree prevents the counter fastener member 6 from sliding out of the attachment opening 37h of its own accord. Even if this should happen during the use of the tire chain, the two changes of direction of the displacement movement of the counter fastener member 6 ensure that the counter fastener member 6 does not slip out of the fastener member 5h. As an additional securing feature, the depression 76h is provided, which is disposed in the extension of the intermediate guide portion 84 so that the counter fastener member 6 first moves into the depression 76h where it is prevented from changing its direction of movement. In spite of the two changes of the displacement direction, the counter fastener member 6 can be very easily engaged and disengaged. The embodiment according to FIGS. 20 and 21 is particularly advantageous because the fastener member 5h is made in one piece and no additional parts are necessary for the securing element.

All the fasteners 7 described are so constructed that they are closed automatically when the inner part 1 formed by a fitting member 4 is elastically pressed together. For fitting the tire chain, the fitting member 4 is elastically expanded and pushed over the tire. Behind the tire, the fitting member 4 can spring back into its original ring shape illustrated in FIG. 22. In this starting position, the fastener member 5 and the counter fastener member 6 are spaced from each other. This has the advantage that upon subsequent closure of the fastener 7, the two fastener members 5 and 6 are engaged under tension and this ensures an additional protection against unintentional release of the fastener 7. When the fitting member 4 has been pushed over the tire, the fastener 7 is pressed together by the user from the outside of the tire. The two fitting member ends are thus brought together and the counter fastener member 6 and the fastener member 5 are moved towards each other in the direction of the arrows 85 and 86 of FIG. 22. The counter fastener member 6 then moves in the manner described with its side 54 into the introduction opening of the fastener member 5 and is displaced automatically along the inclined faces into the guide position and from the latter into the attachment opening. The user of the tire chain thus during closure need not plug the two fastener members 5 and 6 together by hand but can close the fastener 7 simply by resilient compression of the fitting member 4. Due to the configuration described for the fastener members 5 and 6, it is reliably ensured that the two fastener members are also connected together.

To facilitate the closure, a fitting device 87 can be provided which consists of elongated grip members 88 and 89 (FIG. 22). They are provided in each case with a plug extension 90 and 91, each associated with a socket 92 and 93 in the fitting member 4. The plug extensions 90, 91 and the sockets 92, 93 are so constructed that the grip members 88,89 are engaged in a clamping manner in the sockets. For closing the fastener 7, the grip members 88, 89 are plugged with the plug extensions 90,91 into the sockets 93, 94 and then the fitting member 4 is resiliently pressed together by means of the grip members so that the fastener members 5 and 6 can engage in each other. Due to the clamping, the user can easily determine whether he has compressed the fitting member 4 elastically to a sufficient extent for the fastener members 5,6 to have engaged in each other. If this is not the case, when the grip members 88,89 are withdrawn from the sockets 92, 93, the fitting member 4 is resiliently expanded and this is immediately detected by the user. The user thus has a check on whether the fastener 7 has in fact properly been closed.

Figure 23:
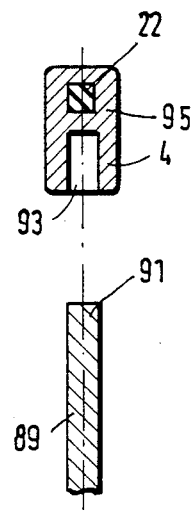
FIG. 23 is a section taken along the line XXIII—XXIII in FIG. 22.

The grip members 88, 89 have a rectangular cross-section and are made integral with the plug extensions 90,91 which have the same thickness as the grip members (FIG. 23). The sockets 92, 93 are provided in widened portions 94, 95 of the fitting member 4 which project outwardly beyond the latter. Preferably, the widened portions 94, 95 are intermediate elements which are pushed onto the spring wire part 22. As FIG. 22 shows, these widened portions 94, 95 simultaneously serve as spacers for the chain strands or portions 8 of the tread part 2. To prevent twisting of the widened portions 94, 95, the spring steel portion or wire part 22 preferably has a rectangular cross-section. The connection links 96 of the chain strands 8 of the tread part 2 are preferably elongated links which with their parallel legs bear directly on the spring steel portion or wire part 22. As a result, the connection links 96 are also prevented from turning and consequently a twisting of the tread part 2 when the tire chain is fitted to the tire is prevented with certainty.

The embodiments described as to fastener members and counter fastener members are distinguished by a structurally simple form, by being simple to manufacture and by functional reliability. With them, the fastener 7 may be automatically closed without the user having to plug the two members together by hand. The fastener members 5 and 6 are moreover so constructed that they cannot become clogged with dirt, snow, ice and the like, so that reliable closing and opening of the fastener is ensured even under unfavorable weather conditions.

The reliable closure is further promoted by the fastener member and the counter fastener member being at substantially the same projected height with respect to the tire so that on elastic compression of the fitting member 4 the two parts reliably meet each other and can be connected together.

Upon fitting of the tire chain on a tire, after the closure of the fastener 7 at the inside of the tire, the tension strand 11 is pulled through the opening 12 of the deflecting element 10 and, when the necessary tension has been reached, the tensioning strand 11 is pulled into the narrow opening portion. The tensioning strand 11 thus remains in the tensioned position and during the subsequent threading operation into the outer part 3 need not be kept under tension by hand. This not only facilitates the fitting of the tire chain but also ensures that the tire chain when first placed in position already has the necessary tension. Since the tensioning strand 11 is provided only in the outer part 3, it can be made relatively short which permits a very clear fitting of the tire chain for the user. The tire chain can thus be fitted without any difficulty even by drivers having little experience. After being placed on the tire, the chain is already in the proper position with respect to the tire, so that thereafter it is only necessary to close the fastener at the inner side and tighten the tensioning strand 11 and thread the latter. The deflecting element 10 preferably consists of plastic so that it is resistant to corrosion. At the transition from the wider portion to the narrower portion of the keyhole-shaped pull-through opening 12 (FIG. 6) or similarly oblong loop or ring opening 38 (FIGS. 15 and 19), an elastically compressible knob is provided so that the respective link of the tensioning strand 11 can only be pushed into the smaller opening portion by elastic deformation of such an elastically compressible knob. This provides an additional securing of the engaged tensioning strand 11 and makes it impossible for the latter to slip back from the narrow portion to the wider portion of the opening unintentionally during threading into the outer part 3. Since the tensioning strand 11 is led back in the direction of its securing to the outer part 3, an additional securing in the narrower opening portion is not however absolutely essential.

The present invention is, of course, in no way restricted to the specific disclosure of the specification and drawings, but also encompasses any modifications within the scope of the appended claims.

What we claim is:

1. A tire chain, in particular an anti-skid or antislip tire chain, including an inner part and an outer part as well as a tread part which joins the inner part and the outer part in assembled relationship therewith, of which the inner part comprises: at least one fastener having a fastener member and a counter fastener member; said fastener member having means that form an introduction opening and an attachment opening into which the counter fastener member can be engaged and said counter fastener member being frame shaped defining on opening which connects to the fastener member; the introduction opening being open in a direction towards the counter fastener member; the introduction opening being joined via at least one guide portion extending transversely of the insertion direction of the counter fastener member in a tapered relationship to the attachment opening which lies transversely of the guide portion; a resilient fitting member, having connections to fitting aids formed by grip members which are to be connected to the connections; and, in a region between the introduction opening and the attachment opening, at least one securing element being provided for said counter fastener member to prevent unintentional disengagement thereof, said fastener member and said counter fastener member forming a fastener connection opened to mount the tire chain in assembled relationship of inner, outer and tread parts over a tire subject to securing engagement of said fastener member and said counter fastener member behind the tire via said resilient fitting member in a single manipulation thereof without being visible during fastening thereof.

2. A tire chain, in particular an anti-skid or antislip tire chain, including an inner part and an outer part as well as a tread part which joins the inner part and the outer part, of which the inner part comprises: at least one fastener having a fastener member and a counter fastener member; said fastener member having means that form an introduction opening and an attachment opening into which the counter fastener member can be engaged and said counter fastener member being frame shaped defining on opening which connects to the fastener member; the introduction opening being open in a direction towards the counter fastener member; the introduction opening being joined via at least one guide portion extending transversely of the insertion direction of the counter fastener member to the attachment opening which lies transversely of the guide portion; and, in a region between the introduction opening and the attachment opening, at least one securing element being provided for said counter fastener member; and further including a tensioning strand having a deflecting element associated therewith in the outer part, said deflecting element being plate-shaped and including a keyhole-shaped pull-through opening for said tensioning strand, the one end of the outer part and the one end of an end-side chain strand portion of the tread part being articulately connected to said deflecting element.

3. A tire chain according to claim 2, wherein said fastener member and said counter fastener member are disposed at opposite ends of a resilient fitting member.

4. A tire chain according to claim 2, wherein the introduction opening tapers in a direction towards a guide portion and is formed by two legs of a U-shaped fastener member, the fastener member and the counter fastener member respectively being formed as plate-shaped stamping parts.

5. A tire chain according to claim 4, wherein said guide portion is defined by a cross web connecting the two legs of the fastener member.

6. A tire chain according to claim 2, wherein said securing element is provided on a leg of the fastener member.

7. A tire chain according to claim 2, wherein said securing element is disposed pivotally movable on the fastener member.

8. A tire chain according to claim 7, wherein a spring is provided with said securing element which is pivotally movable against spring force from a closure position into a release position, said securing element being U-shaped and having legs thereof engaging over one leg of said fastener member, and having a cross web of said securing element forming an abutment for said spring.

9. A tire chain according to claim 2, wherein said securing element is provided with a grip which is formed by a portion of said securing element projecting beyond said fastener member.

10. A tire chain according to claim 2, wherein said securing element is a leaf spring secured to one of the legs of said fastener member.

11. A tire chain according to claim 2, wherein said securing element is located fixedly on the fastener member and is a ring surrounding a portion of the fastener member.

12. A tire chain according to claim 11, wherein said securing element is made integral with said fastener member.

13. A tire chain according to claim 2, wherein said securing element bears in the closure position on a free end of one leg of the fastener member, and that the free end of a further leg of the fastener member extends at an acute angle in a direction towards the one leg of the fastener member and forms an attachment hook for the counter fastener member.

14. A tire chain according to claim 2, which further includes a fitting member, having connections to fitting aids formed by grip members which are to be connected to the connections.

15. A tire chain, in particular an anti-skid or antislip tire chain, including an inner part and an outer part as well as a tread part which joins the inner part and the outer part, of which the inner part comprises: at least one fastener having a fastener member and a counter fastener member; said fastener member having means that form an introduction opening and an attachment opening into which the counter fastener member can be engaged and said counter fastener member being frame shaped defining on opening which connects to the fastener member; the introduction opening being open in a direction towards the counter fastener member; the introduction opening being joined via at least one guide portion extending transversely of the insertion direction of the counter fastener member to the attachment opening which lies transversely of the guide portion; and, in a region between the introduction opening and the attachment opening, at least one securing element being provided for said counter fastener member; and further including a fitting member, having connections to fitting aids formed by grip members which are to be connected to the connections, said connections being sockets in said fitting member, and said fitting aids comprising plug extensions that engage with clamping in the connections which lie in a region of the fastener member and the counter fastener member.

* * * * *